(12) United States Patent
Morita (10) Patent No.: US 10,471,487 B2
(45) Date of Patent: Nov. 12, 2019

(54) ROLLING EQUIPMENT (71) Applicant: TOSHIBA MITSUBISHI-ELECTRIC INDUSTRIAL SYSTEMS CORPORATION, Chuo-ku (JP)

(72) Inventor: Shinichi Morita, Chuo (JP)

(73) Assignee: TOSHIBA MITSUBISHI-ELECTRIC INDUSTRIAL SYSTEMS CORPORATION, Chuo-ku (JP)

(*) Notice: Subject to any disclaimer, the term of this patent is extended or adjusted under 35 U.S.C. 154(b) by 0 days.

(21) Appl. No.: 15/549,548

(22) PCT Filed: Mar. 9, 2015

(86) PCT No.: PCT/JP2015/056878
§ 371 (c)(1),
(2) Date: Aug. 8, 2017

(87) PCT Pub. No.: WO2016/143048
PCT Pub. Date: Sep. 15, 2016

(65) Prior Publication Data
US 2018/0021824 A1 Jan. 25, 2018

(51) Int. Cl.
*B21B 1/34* (2006.01)
*B21B 45/00* (2006.01)
(Continued)

(52) U.S. Cl.
CPC ............. *B21B 1/34* (2013.01); *B21B 45/004* (2013.01); *C21D 1/42* (2013.01); *C21D 8/0226* (2013.01);
(Continued)

(58) Field of Classification Search
CPC ......... B21B 37/48; B21B 37/74; B21B 38/06; B21B 45/004; B21B 2265/06; B21B 1/34; B21B 1/32
See application file for complete search history.

(56) References Cited

U.S. PATENT DOCUMENTS 5,142,891 A * 9/1992 Kuwano ................ B21B 38/06
72/11.4
5,771,732 A 6/1998 Krämer et al.
(Continued)

FOREIGN PATENT DOCUMENTS

CN 1052803 A 7/1991
CN 1144722 A 3/1997
(Continued)

OTHER PUBLICATIONS

JP 01122605 A translation from EPO website, Accessed Sep. 2018.*
(Continued)

*Primary Examiner* — Pradeep C Battula
(74) *Attorney, Agent, or Firm* — Oblon, McClelland, Maier & Neustadt, L.L.P.

(57) ABSTRACT

According to an embodiment of the invention, a rolling equipment includes two coiler furnaces; a plurality of mill stands provided between the two coiler furnaces, the plurality of mill stands being for reverse rolling; and an induction heater provided between the plurality of mill stands, the induction heater implementing a heated temperature increase in a designated reverse rolling or in each reverse rolling, the heated temperature increase being in a hot strip longitudinal direction and width direction. Thus, the hot strip temperature distribution can be improved.

8 Claims, 11 Drawing Sheets

(51) Int. Cl.
  *B21B 37/74* (2006.01)
  *B21B 37/48* (2006.01)
  *C21D 8/02* (2006.01)
  *C21D 8/04* (2006.01)
  *C21D 1/42* (2006.01)
  *B21B 38/06* (2006.01)

(52) U.S. Cl.
  CPC ......... *C21D 8/0252* (2013.01); *C21D 8/0426* (2013.01); *C21D 8/0452* (2013.01); *B21B 37/48* (2013.01); *B21B 37/74* (2013.01); *B21B 38/06* (2013.01); *B21B 2265/06* (2013.01)

(56) References Cited

U.S. PATENT DOCUMENTS

| | | | | |
|---|---|---|---|---|
| 5,910,185 | A * | 6/1999 | Figge | B21B 45/004 |
| | | | | 219/653 |
| 6,286,354 | B1 * | 9/2001 | Kajiwara | B21B 37/28 |
| | | | | 72/237 |
| 2005/0247702 | A1 * | 11/2005 | Eguchi | B21B 45/004 |
| | | | | 219/653 |

FOREIGN PATENT DOCUMENTS

| | | | |
|---|---|---|---|
| CN | 1205918 A | 1/1999 | |
| CN | 101001705 A | 7/2007 | |
| EP | 0839588 A1 * | 5/1998 | ............. B21B 37/74 |
| JP | 01122605 A * | 5/1989 | |

OTHER PUBLICATIONS

Text Document showing advantage of Patent Family including U.S. Pat. No. 5,910,185 (Year: 2019).*
Combined Office Action and Search Report dated Jul. 19, 2018 in Chinese Patent Application No. 201580077473.4, with partial English translation, 14 pages.
International Search Report dated May 26, 2015, in PCT/JP2015/056878 filed Mar. 9, 2015.
Office Action dated Dec. 7, 2018 in Chinese Patent Application No. 201580077473.4 (with partial English translation).
Chinese Office Action dated Mar. 8, 2019 in Chinese Patent Application No. 201580077473.4 (with partial unedited computer generated English translation), 11 pages.

* cited by examiner

ROLLING EQUIPMENT

FIELD

Embodiments of the invention relate to rolling equipment. More specifically, two coilers having heat retention called coiler furnaces are included frontward and rearward of rolling mills; and embodiments of the invention relate to the layout and hot strip temperature compensation method of an induction heater novelly mounted between the rolling mills to improve the temperature distribution of the hot strip in the reverse rolling of the rolling equipment including multiple rolling mills (a so-called Steckel mill).

BACKGROUND ART

In the reverse rolling of the Steckel mill, although two of the coiler furnaces having the heat retention function are included frontward and rearward of the rolling mills, even then, the temperatures decrease for the hot strip width end portions and front and tail end portions released from the coiler furnaces.

Then, there is a device such as in Patent Document 1 relating to a Steckel mill in the case of one rolling mill in which a heater is mounted between the coiler furnace and the rolling mill to attempt to improve the hot strip temperature. However, if the heater is a burner, heating is from the surface; the temperature increase efficiency is poor; and effects better than those of the coiler furnace cannot be expected. Also, in the case where the inductor gap is caused to approach the hot strip as much as possible to increase the efficiency as in an induction heater, even if pinch rolls are mounted, the precision of the tension detection and the tension control between the coiler furnace and the mill stand cannot be increased; and when hot strip tension loosens, the hot strip contacts the apparatus when forming a loop configuration; and it is considered that the probability of being easily damaged is high. If the inductor gap is opened in the safe direction, the heating efficiency degrades or the heating cannot be performed. Also, the locations at the rolling mill entrance and exit where the heater is mounted in the device is generally where many sensors for automatic rolling control having high priority such as strip thickness gauges, strip width gauges, radiation thermometers, hot strip detection, etc., are mounted; and there are many cases where the mounting space of the heater is not available. Also, for a multiple-mill stand configuration, there are no devices or patents describing improvement of the hot strip temperature distribution by a heater other than the coiler furnaces.

CITATION LIST

Patent Literature

[PTL 1]
U.S. Pat. No. 5,771,732 specification

SUMMARY OF INVENTION

Technical Problem

Conventionally, in the reverse rolling of a Steckel mill, although two of the coiler furnaces having the heat retention function are included frontward and rearward of the mill stands, even then, the temperatures decrease for the hot strip width end portions and front and tail end portions detached from the coiler furnaces. In a general example, for the hot strip average temperature (in the width-direction central portion) in each reverse rolling, the pre-reverse pass longitudinal-direction hot strip temperature is entirely 1000° C. or more; but as the reverse passes proceed, in the third reverse pass, the temperature is entirely 1000° C. or less, and is quite low at the third-pass tail end portion. In the final seventh pass, there is a difference of about 100° C. between the longitudinal-direction central portion maximum temperature and the front end portion minimum temperature. Also, the temperature drop due to the heat dissipation is large at the width-direction end portions as well; and as expected, a further decrease of about 50° C. occurs in each longitudinal direction compared to the average temperature. Accordingly, it is problematic that the hot strip quality yield is poor due to such a hot strip temperature distribution.

The invention is directed to solve problems such as those recited above and to improve the conventional hot strip temperature distribution.

DESCRIPTION OF EMBODIMENTS

Various embodiments will be described hereinafter with reference to the accompanying drawings.

The drawings are schematic or conceptual. The relationship between the thickness and the width of each portion, and the size ratio between the portions, for instance, are not necessarily identical to those in reality. Furthermore, the same portion may be shown with different dimensions or ratios depending on the figures.

In the present specification and the drawings, components similar to those described previously with reference to earlier figures are labeled with like reference numerals, and the detailed description thereof is omitted appropriately.

(First Embodiment)

Figure 1:
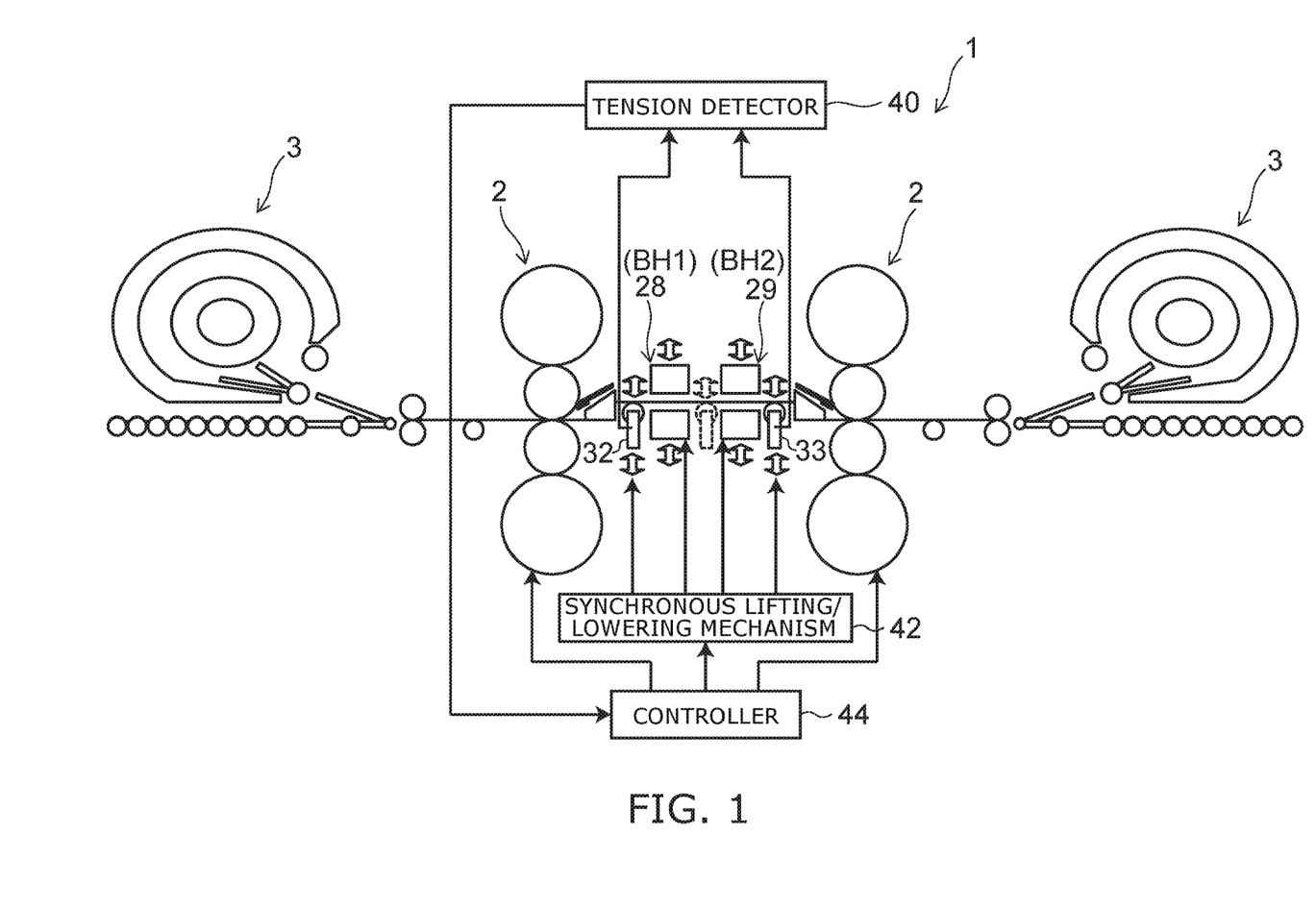
FIG. 1 is a schematic view illustrating rolling equipment according to a first embodiment.

FIG. 1 is a schematic view illustrating rolling equipment according to a first embodiment.

As illustrated in FIG. 1, a Steckel mill 1 (rolling equipment) includes a pair of coiler furnaces 3, and multiple mill stands 2 disposed between the coiler furnaces 3. Each of the coiler furnaces 3 is a coiler having a heat retention function. The Steckel mill 1 performs reverse rolling while heating the hot strip using the coiler furnaces 3. In the example, two mill stands 2 are provided between the coiler furnaces 3. The number of the mill stands 2 is not limited to two and may be three or more.

The Steckel mill 1 further includes a pair of bar heaters 28 and 29 (induction heaters) and a pair of tension rolls 32 and 33. The transverse-type bar heater 28 (BH1) and bar heater 29 (BH2) in which the gap to the hot strip can be changeable are disposed between the two mill stands 2; and the tension roll 32 and the tension roll 33 that can be lifted and lowered to perform the inter stand tension control are further disposed on the outer sides of the bar heater 28 and the bar heater 29.

A stable inter mill stand tension control is implemented by fixing the two tension rolls 32 and 33 at the same raised height after the hot strip front end is engaged by the next rolling mill, and by controlling the rolling mill speed using the tensile force value from a tension detector 40. A trapezoid is formed from the hot strip; and the temperature increase due to the induction heater recited above is made easier. Also, the contact with the hot strip warp is avoided by opening the inductor gap when detecting a loop and detecting zero tension during rolling.

In the Steckel mill 1, an induction heater that is optimal as the heater for improving the hot strip temperature is applied. By moving the hot strip in a direction across the flux generated by the induction heater, the hot strip is heated from the hot strip interior by the iron loss due to the eddy current generated by the flux inside the hot strip. The principle of the bar heaters 28 and 29 which are induction heaters having a better heated temperature increase rate and efficiency than the surface heating of a gas burner, etc., will now be described.

Figure 2:
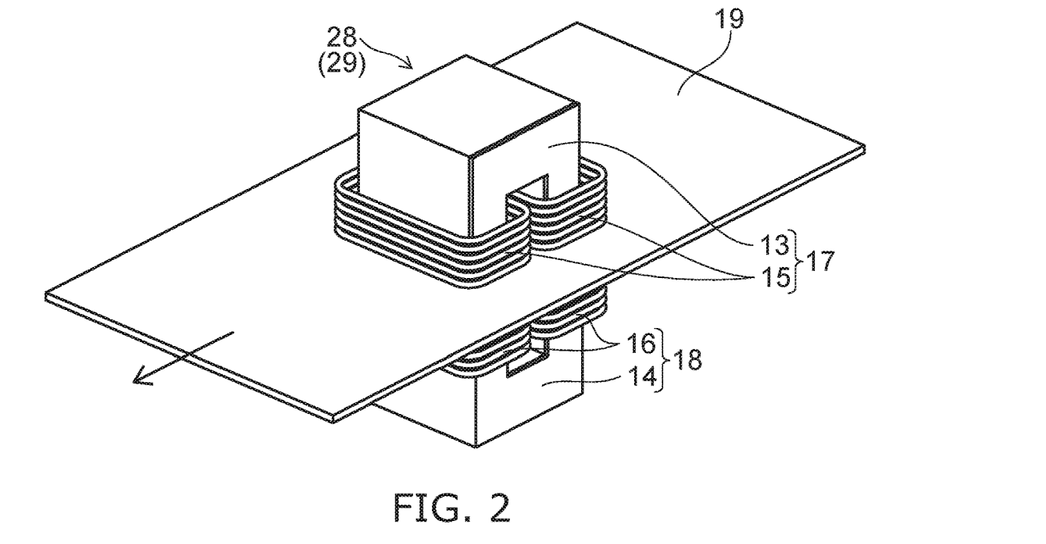
FIG. 2 is a perspective view schematically illustrating the bar heaters.

FIG. 2 is a perspective view schematically illustrating the bar heaters.

As illustrated in FIG. 2, the transverse-type bar heaters 28 and 29 include an upper inductor 17 including an upper U-shaped iron core 13 and an upper copper tube coil 15, similarly include a lower inductor 18 including a lower U-shaped iron core 14 and a lower copper tube coil 16, and are arranged to sandwich a hot strip 19 from above and below.

Figure 3:
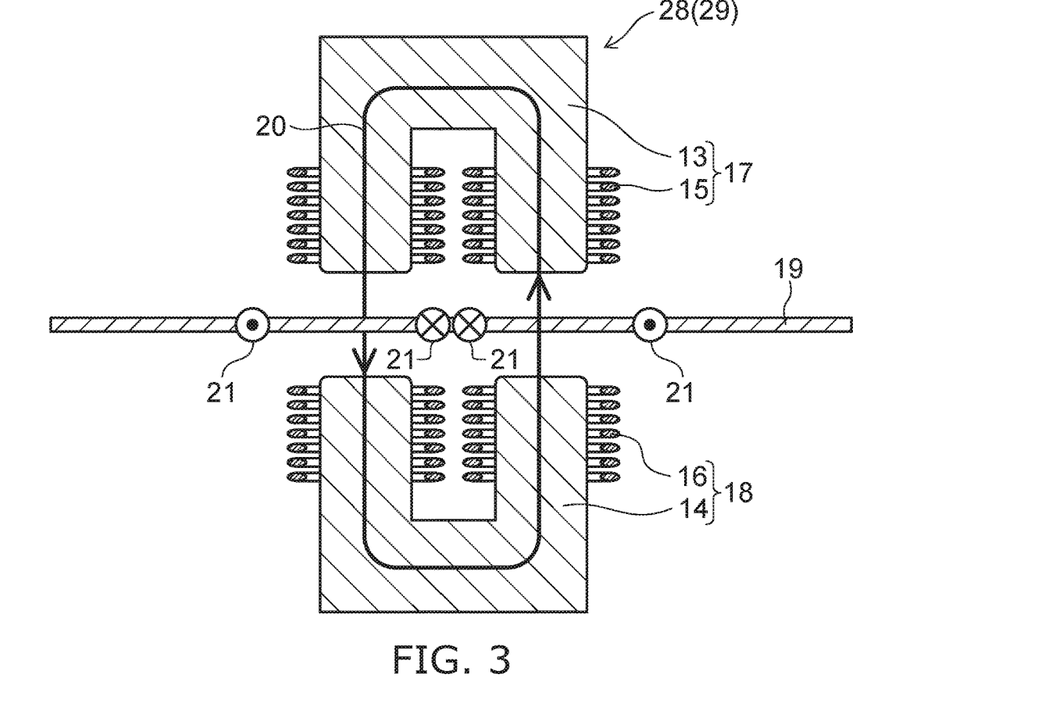
FIG. 3 is a schematic view illustrating the heating principle of the transverse-type bar heater.

FIG. 3 is a schematic view illustrating the heating principle of the transverse-type bar heater.

As illustrated in FIG. 3, a current is caused to flow in the copper tube coils 15 and 16; and flux Φ 20 pierces the hot strip 19 perpendicularly using the U-shaped iron cores 13 and 14 as a magnetic path. Then, an eddy current 21 is generated inside the hot strip 19 and heats due to the iron loss. The induction heating method in which the flux Φ 20 pierces the hot strip 19 perpendicularly is called the transverse type.

Figure 4:
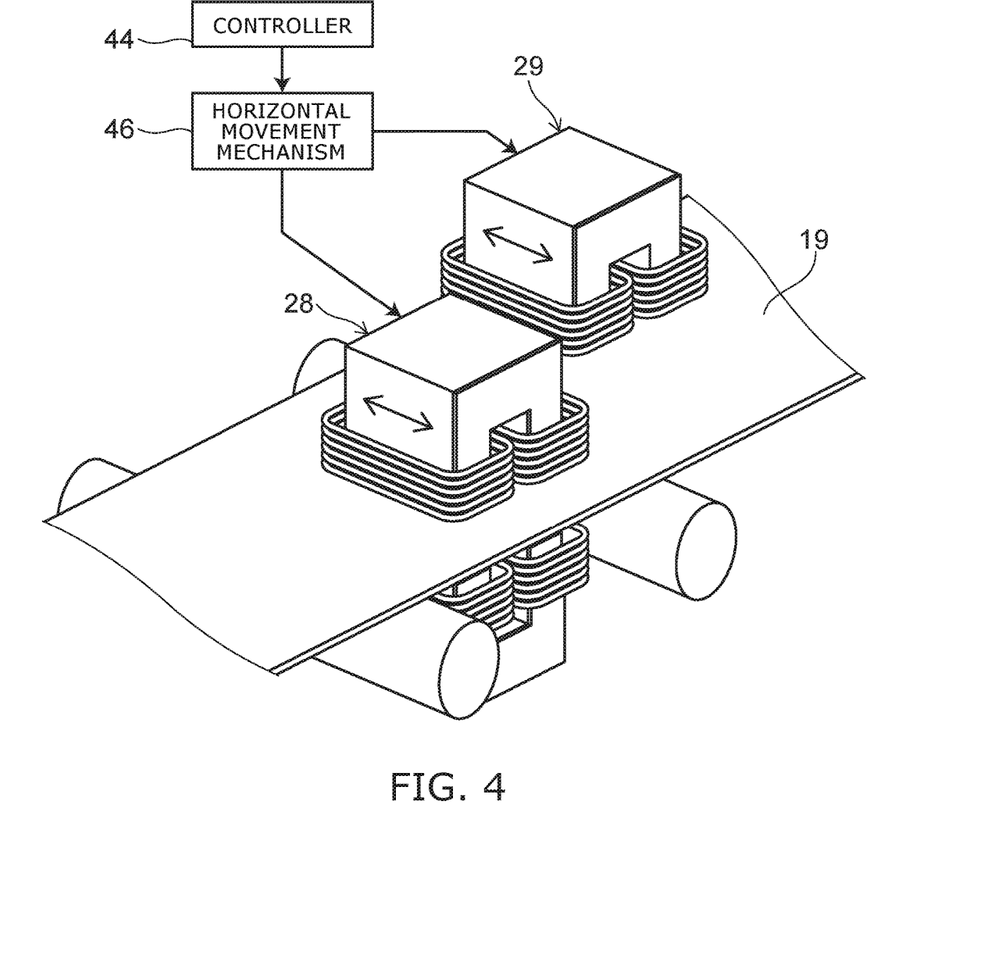
FIG. 4 is a schematic view illustrating the layout of two transverse-type bar heaters.

FIG. 4 is a schematic view illustrating the layout of two transverse-type bar heaters.

As illustrated in FIG. 4, the heated hot strip 19 that is conveyed by table rolls is arranged and subjected to induction heating by using the two transverse-type bar heaters 28 and 29. Movable wheels are attached to the induction heater; and the arrangement of the induction heater in the width direction of the hot strip 19 can be modified freely. Thereby, the setting modification of the heated temperature increase amount of the two transverse-type bar heaters 28 and 29 to have a hot strip width end portion priority or strip width central portion priority temperature increase can be performed continuously by the arrangement modification; and the overall level of the heated temperature increase amount also can be modified continuously and unrestrictedly by controlling the electrical power amount supplied to the induction heater.

For example, the bar heaters 28 and 29 are connected to a horizontal movement mechanism 46. The horizontal movement mechanism 46 moves the bar heaters 28 and 29 individually in the width direction of the hot strip 19. The horizontal movement mechanism 46 is connected to a controller 44. The operation of the horizontal movement mechanism 46 is controlled by the controller 44. Thereby, the heated temperature increase pattern in the width direction can be changed arbitrarily by changing the positions of the bar heaters 28 and 29 in the width direction.

Figure 5A:
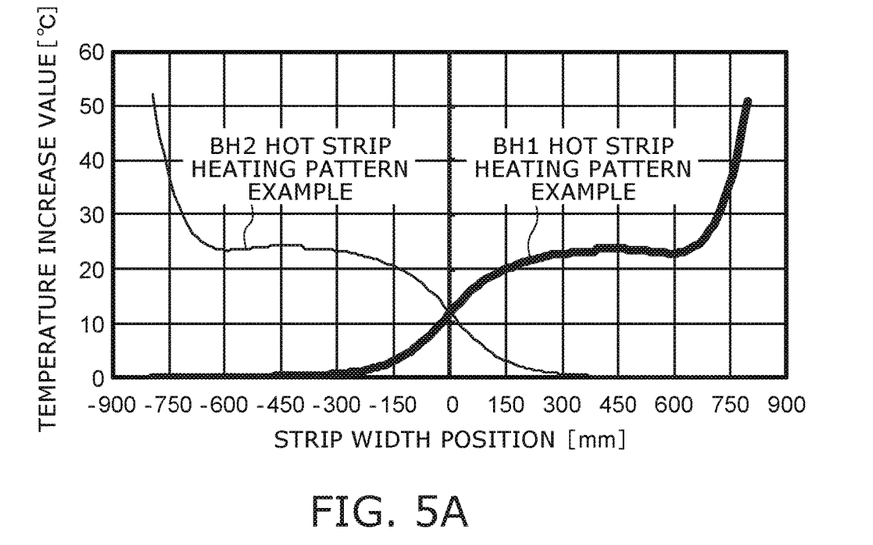
FIG. 5A and FIG. 5B are graphs illustrating an example of the heating pattern of the hot strip by the two transverse-type bar heaters.
Figure 5B:
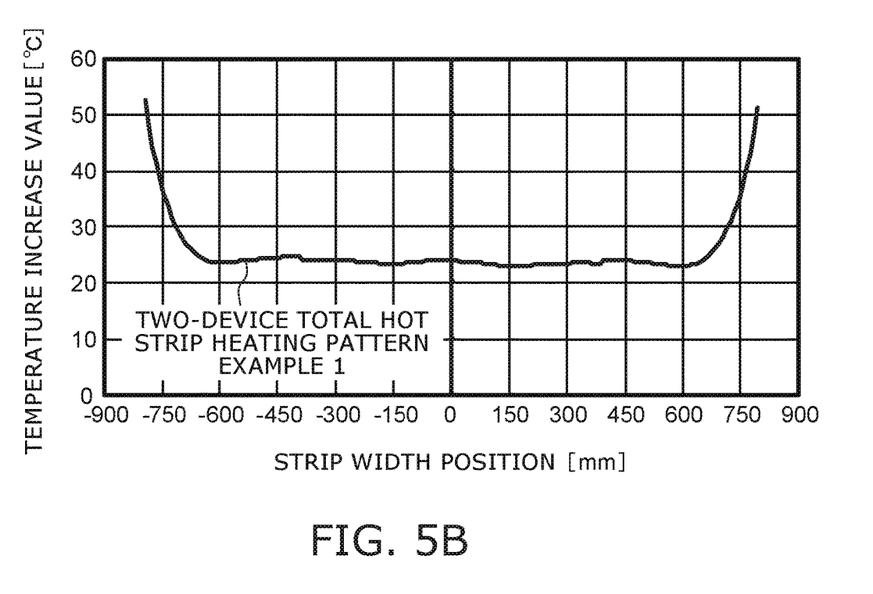

FIG. 5A and FIG. 5B are graphs illustrating an example of the heating pattern of the hot strip by the two transverse-type bar heaters.

FIG. 5A illustrates the heating pattern example of the hot strip 19 by the bar heater 28 and the heating pattern example of the hot strip 19 by the bar heater 29. FIG. 5B illustrates the total heating pattern example of the two bar heaters 28 and 29.

As illustrated in FIG. 5A and FIG. 5B, the heating temperature distribution has high temperatures at the hot strip width end portions and otherwise is flat in the strip width direction; the heated temperature increase level in the longitudinal direction of the hot strip 19 is changeable; and this is the optimal mode for improving the distributions of the temperature in the longitudinal direction and the temperature in the width direction. The reason for this is none other than being able to arrange the transverse-type bar heater 28 and bar heater 29 symmetrically in the width direction of the rolling material and arrange the transverse-type bar heater 28 and bar heater 29 optimally with respect to the strip width.

Also, as the method for controlling the inductor gap when the hot strip front and tail ends pass through the bar heater 28 and the bar heater 29, the inductor gap is pre-opened to have spacious margin not to contact the hot strip warp when there is no tension before a next rolling mill hot strip front end engagement; and the inductor gap is closed to an appropriate heating gap at or after a tension generation after the next rolling mill hot strip front end engagement. Also, a control is performed to eliminate the damage of the induction heater by opening the inductor gap to avoid the contact with the hot strip warp slightly before the tensionless state caused by the tail end of the hot strip exiting the rolling mill.

The tension rolls 32 and 33 and the bar heaters 28 and 29 each are connected to a synchronous lifting/lowering mechanism 42. The synchronous lifting/lowering mechanism 42 changes the positions in the height direction of the tension rolls 32 and 33 and maintains the positions to be constant. Simultaneously, the synchronous lifting/lowering mechanism 42 sets the pass line reference height of the inductors 17 and 18 of the bar heaters 28 and 29 synchronously with the heights of the tension rolls 32 and 33. However, the inductor gap (the distance between the upper inductor 17 and the lower inductor 18) is set independently based on the pass line reference.

The synchronous lifting/lowering mechanism 42 is connected to the controller 44. The positions of the tension rolls 32 and 33 and the pass line reference position of the bar heaters 28 and 29 undergo synchronous control by the controller 44. The tensile force value from the tension detector 40 is input to the controller 44. The tension detector 40 detects the tensile force of the hot strip 19 rolled by the mill stands 2 and inputs the detected tensile force value to the controller 44. For example, the tension detector 40 detects the tensile force applied to the hot strip 19 from load cells included in the tension rolls 32 and 33, etc.

Also, the controller 44 is connected to each of the mill stands 2 and controls the operation of each of the mill stands 2. As described above, the controller 44 implements a stable inter mill stand tension control by controlling the speeds of the mill stands 2 using the tensile force value from the tension detector 40. The controller that controls the operation of each of the mill stands 2 may be separated from the controller controlling the operation of the synchronous lifting/lowering mechanism 42.

Figure 6:
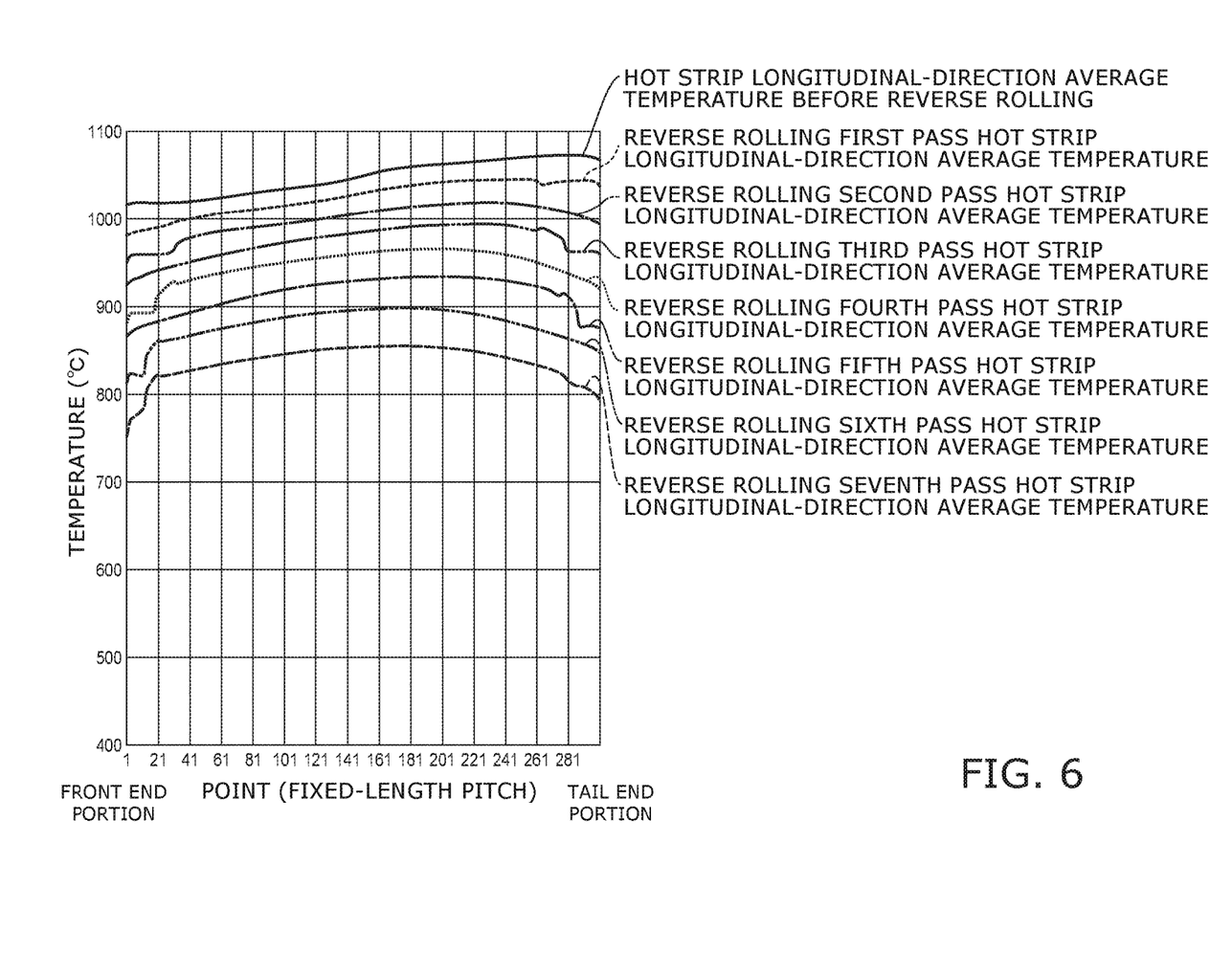
FIG. 6 is a graph illustrating an example of the hot strip average temperature in the reverse rolling.

FIG. 6 is a graph illustrating an example of the hot strip average temperature in the reverse rolling.

FIG. 6 illustrates the hot strip average temperature (in the width-direction central portion) in each reverse rolling of a reference Steckel mill performing the heat retention of the hot strip using only the coiler furnaces. In the example, the pre-reverse pass longitudinal-direction hot strip temperature is entirely 1000° C. or more; but as the reverse passes proceed, in the third reverse pass, the temperature is entirely 1000° C. or less, and is quite low at the third-pass tail end portion. In the final seventh pass, there is a difference of about 100° C. between the longitudinal-direction central portion maximum temperature and the front end portion minimum temperature. Although not illustrated here, the temperature drop due to the heat dissipation is large at the width-direction end portions as well; and as expected, a further decrease of about 50° C. occurs in each longitudinal direction compared to the average temperature. Accordingly, the hot strip quality yield is poor due to such a hot strip temperature distribution.

Conversely, in the Steckel mill 1 according to the embodiment, the bar heaters 28 and 29 are provided between the two mill stands 2; and induction heating of the hot strip 19 is performed by the bar heaters 28 and 29. Thereby, the hot strip temperature distribution can be improved by implementing the temperature increase in the hot strip longitudinal direction and width direction in a designated reverse rolling or in each reverse rolling. For example, the yield can be increased.

Also, the tensile force of the hot strip 19 can be controlled appropriately between the mill stands 2. Thereby, for example, the damage of the bar heaters 28 and 29 due to the contact with the hot strip 19 can be suppressed. For example, the hot strip 19 can be heated efficiently by appropriately setting the inductor gap.

(Second Embodiment)

Figure 7:
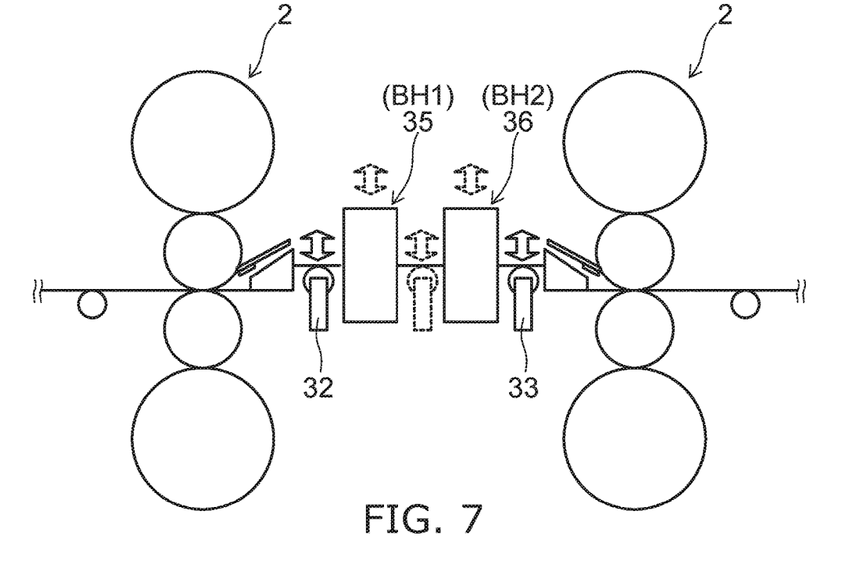
FIG. 7 is a schematic view illustrating rolling equipment according to a second embodiment.

FIG. 7 is a schematic view illustrating rolling equipment according to a second embodiment.

The second embodiment of the invention will now be described based on FIG. 7. A portion of the Steckel mill is illustrated as being extracted in FIG. 7.

In FIG. 7, a solenoid-type bar heater 35 (BH1) and a solenoid-type bar heater 36 (BH2) are mounted instead of the transverse-type bar heaters 28 and 29 of FIG. 1 between the mill stands 2; and the tension roll 32 and the tension roll 33 that can be lifted and lowered to perform the inter stand tension control are further disposed on the outer sides of the bar heater 35 and the bar heater 36.

Figure 8:
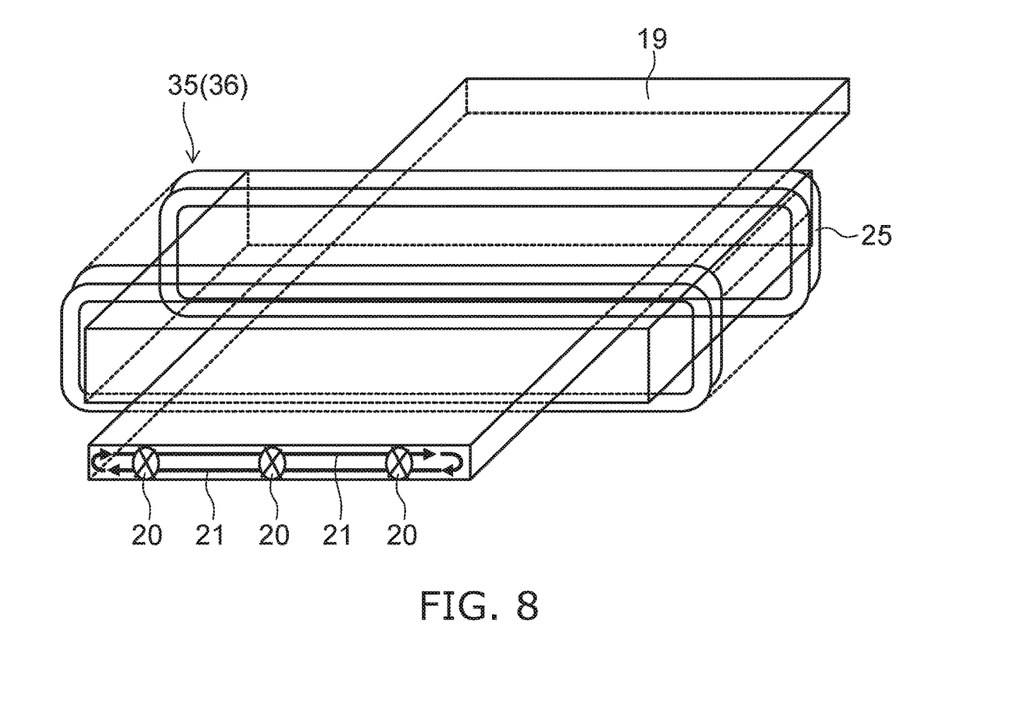
FIG. 8 is a schematic view illustrating the heating principle of the solenoid-type bar heater.

FIG. 8 is a schematic view illustrating the heating principle of the solenoid-type bar heater.

As illustrated in FIG. 8, the solenoid-type bar heaters 35 and 36 include a copper tube coil 25. In the bar heaters 35 and 36, flux 20 pierces the heated material in the longitudinal direction as illustrated due to the current flowing through the solenoid-type copper tube coil 25; due to this action, the eddy current 21 flows to circulate inside the hot strip in the heated hot strip width direction; and the entire width direction of the heated material is heated by the iron loss. This induction heating method is called the solenoid type. In this induction heater as well, the temperature increase of the hot strip temperature can be performed substantially uniformly in the width direction; and the level of the temperature increase also can be modified continuously and unrestrictedly by controlling the electrical power amount supplied to the induction heater. Accordingly, this is used as an improvement measure of the longitudinal-direction temperature distribution of the Steckel mill.

A stable inter mill stand tension control is implemented by fixing the two tension rolls 32 and 33 at the same raised height after the front end of the hot strip 19 is engaged by the next rolling mill, and by controlling the rolling mill speed using the tensile force value from the tension detector. The solenoid-type bar heater 35 and the solenoid-type bar heater 36 are lifted and lowered synchronously with the lifting and lowering of the tension rolls 32 and 33. A trapezoid is formed from the hot strip 19; and the temperature increase due to the induction heater recited above is made easier.

Because the temperature increase of the heated temperature increase pattern can be performed uniformly in the strip width direction, temperature-increased compensation of the hot strip longitudinal-direction temperature drop amount is performed by setting the temperature increase amount to be changeable in the longitudinal direction.

(Third Embodiment)

Figure 9:
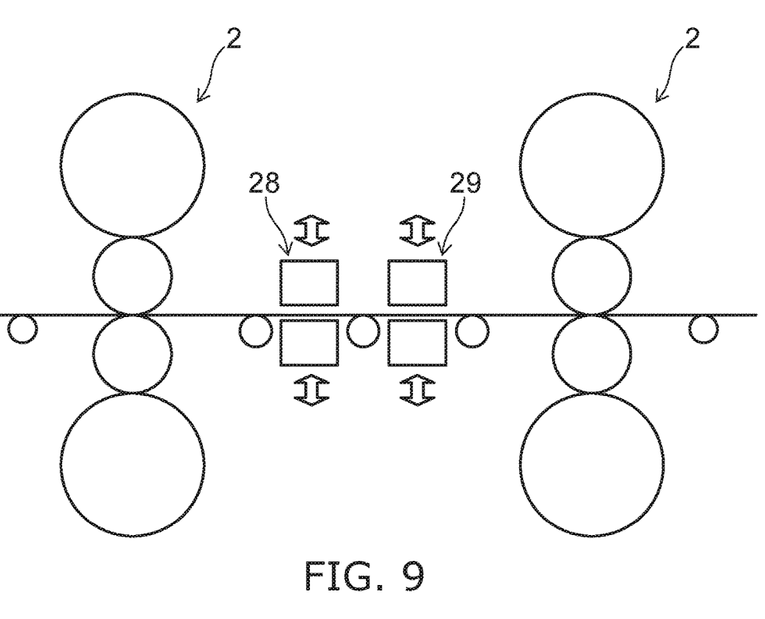
FIG. 9 is a schematic view illustrating rolling equipment according to a third embodiment.

FIG. 9 is a schematic view illustrating rolling equipment according to a third embodiment.

The third embodiment of the invention will now be described based on FIG. 9. A portion of the Steckel mill is illustrated as being extracted in FIG. 9.

In the example as illustrated in FIG. 9, the tension roll 32 and the tension roll 33 that perform the inter stand tension control are not disposed on the outer sides of the transverse-type bar heater 28 and bar heater 29 of FIG. 1 between the mill stands 2; and a tension roll-less inter stand tension control is performed by detecting the inter stand tensile force from the load and the torque fluctuation of the two mill stands 2. As described above, the tension control is implemented by the tension detector 40 and the controller 44. Thereby, the rolling mill speed is controlled; stable inter mill stand tension control is implemented; the contact between the hot strip 19 of the bar heaters 28 and 29 is prevented; and the temperature increase due to the induction heater is made easier.

(Fourth Embodiment)

Figure 10:
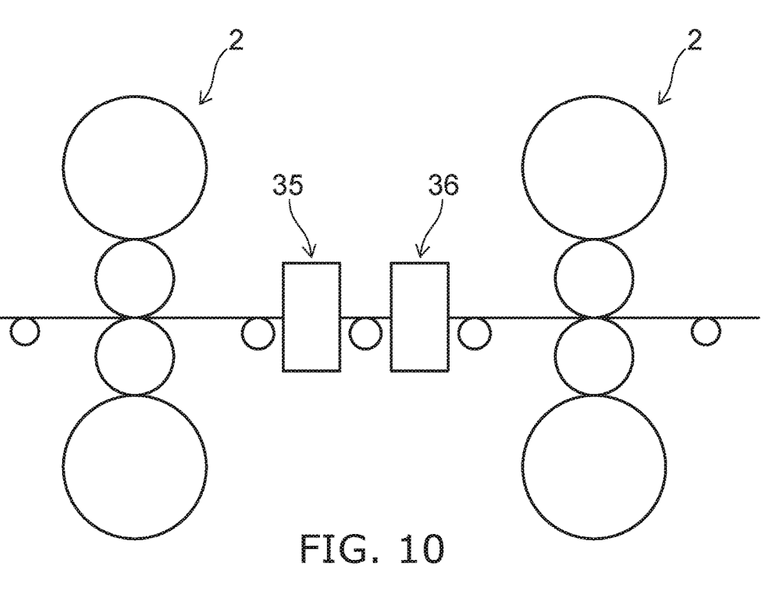
FIG. 10 is a schematic view illustrating rolling equipment according to a fourth embodiment.

FIG. 10 is a schematic view illustrating rolling equipment according to a fourth embodiment.

The fourth embodiment of the invention will now be described based on FIG. 10. A portion of the Steckel mill is illustrated as being extracted in FIG. 10.

In the example as illustrated in FIG. 10, the solenoid-type bar heater 35 and the solenoid-type bar heater 36 are mounted instead of the transverse-type bar heaters 28 and 29 of FIG. 9 between the mill stands 2; tension roll-less inter stand tension control is performed by detecting the inter stand tensile force from the load and the torque fluctuation of the two mill stands 2; the contact between the hot strip 19 and the bar heaters 35 and 36 is prevented; and the temperature increase due to the induction heater is made easier.

(Fifth Embodiment)

FIG. 11A, FIG. 11B, FIG. 12A, and FIG. 12B are graphs illustrating an example of a heating pattern according to a fifth embodiment.

The fifth embodiment of the invention will now be described based on FIG. 11A, FIG. 11B, FIG. 12A, and FIG. 12B.

Figure 11A:
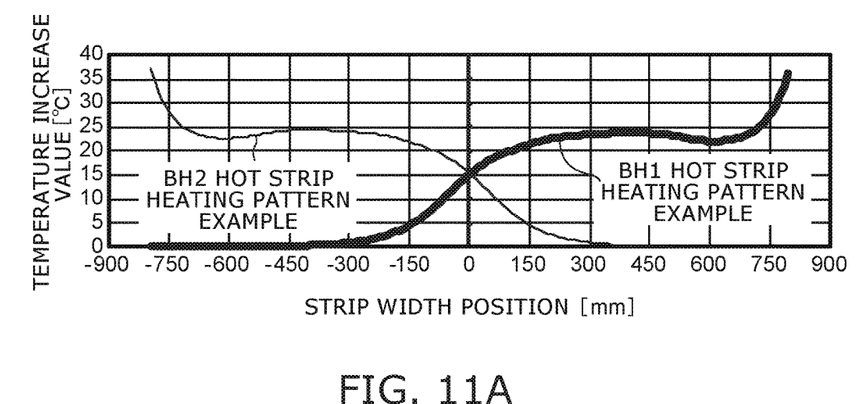
FIG. 11A and FIG. 11B are graphs illustrating an example of a heating pattern according to a fifth embodiment.
Figure 11B:
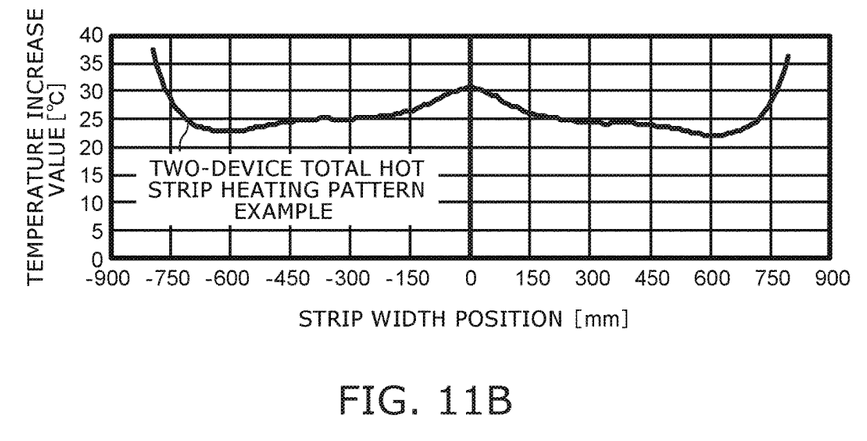
Figure 12A:
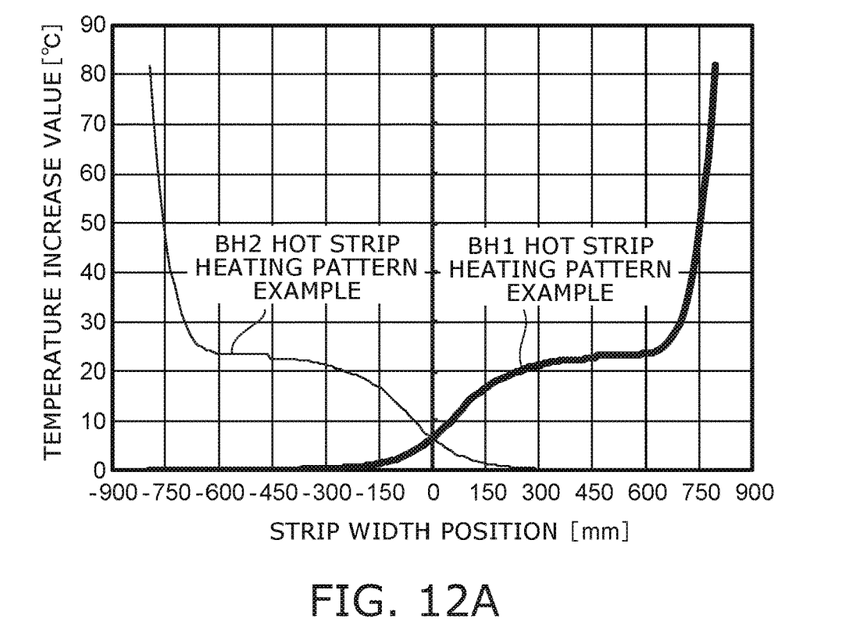
FIG. 12A and FIG. 12B are graphs illustrating an example of a heating pattern according to a fifth embodiment.
Figure 12B:
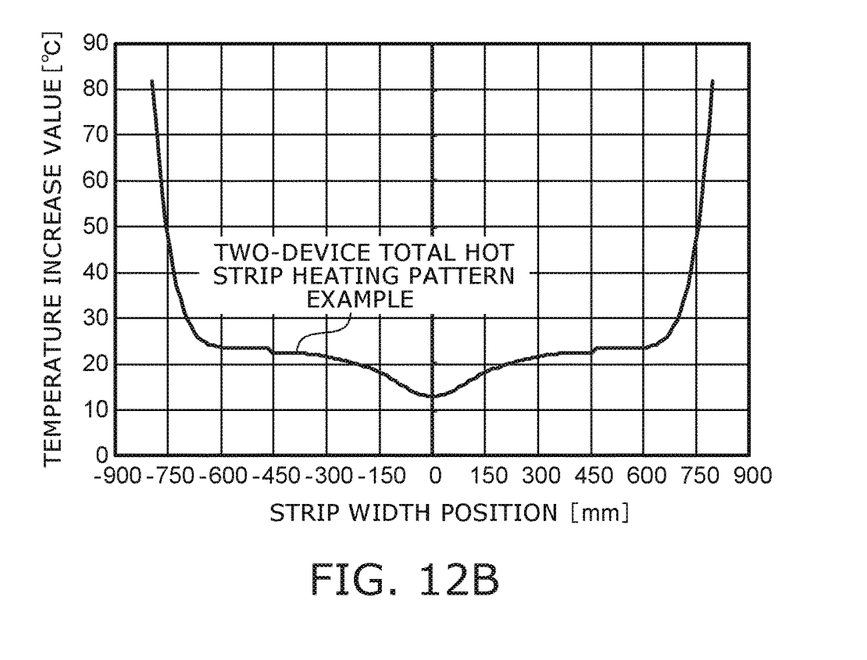

The arrangement in the strip width direction of the transverse-type bar heater 28 and bar heater 29 is changed symmetrically; FIG. 11B is a two-device total hot strip heating pattern example in which the end portion heating temperatures in the rolling material strip width direction are relatively reduced; and FIG. 12B is a two-device total hot strip heating pattern example in which the heating temperatures of the strip width end portions are increased compared to the strip width center. An improvement effect is obtained by modifying the heated temperature increase pattern setting each rolling pass and performing the temperature increase by, for example, using the pattern in which the strip width end portions are low for the rolling passes of the former half and using the pattern in which the heating temperatures of the strip width end portions are increased in the rolling passes of the latter half because the rolling material has become thin and the strip width end portion temperature drop is large. Also, as an example of being changeable in the longitudinal direction, a modification is possible in a heated temperature increase pattern setting in which width end portion heating priority is used proximally to the longitudinal-direction central portion and the strip width central portion is given priority proximally to the longitudinal-direction front and tail end portions. As described above, such a heated temperature increase pattern is controlled by the controller 44. FIG. 11A and FIG. 12A show the heating pattern examples for each of the bar heaters 28 and 29.

(Sixth Embodiment)

Figure 13A:
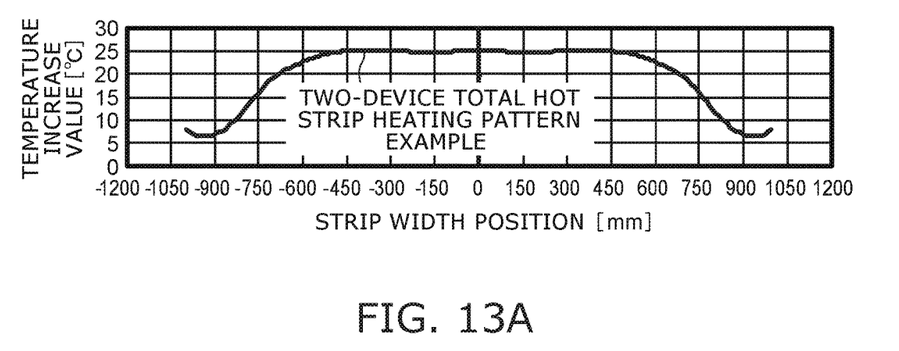
FIG. 13A and FIG. 13B are graphs illustrating an example of a heating pattern according to a sixth embodiment.
Figure 13B:
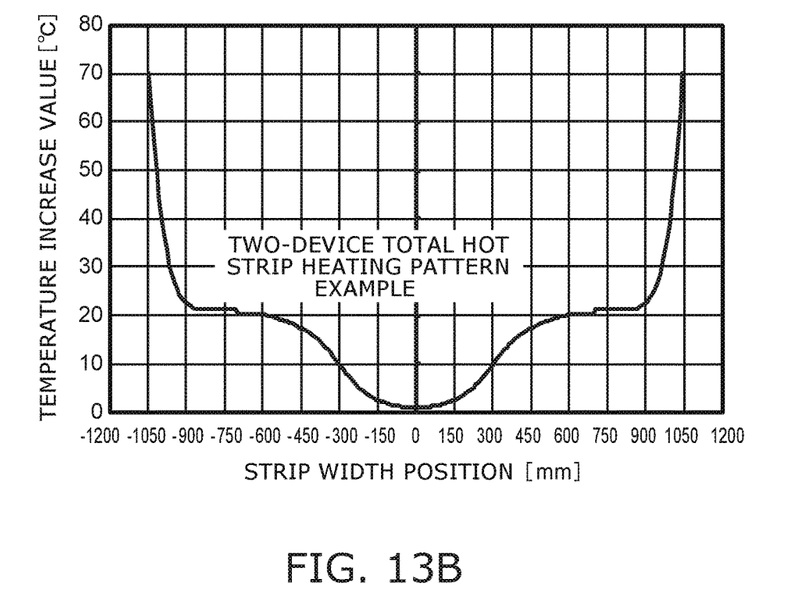

FIG. 13A and FIG. 13B are graphs illustrating an example of a heating pattern according to a sixth embodiment.

The sixth embodiment of the invention will now be described based on FIG. 13A and FIG. 13B.

In the case where the hot strip width is wide compared to the widths of the transverse-type bar heaters 28 and 29, a combination of temperature increase settings includes the two-device total hot strip heating pattern example of FIG. 13A in which the heated temperature increases of the strip width end portions are low compared to the strip width central portion, and the two-device total hot strip heating pattern example of FIG. 13B in which the strip width central portion heated temperature increase is low and the width end portion heated temperature increases are high. Similarly to that described above, the conventional hot strip low-temperature distribution is improved by combinations in the longitudinal direction and for each rolling pass.

(Seventh Embodiment)

Figure 14:
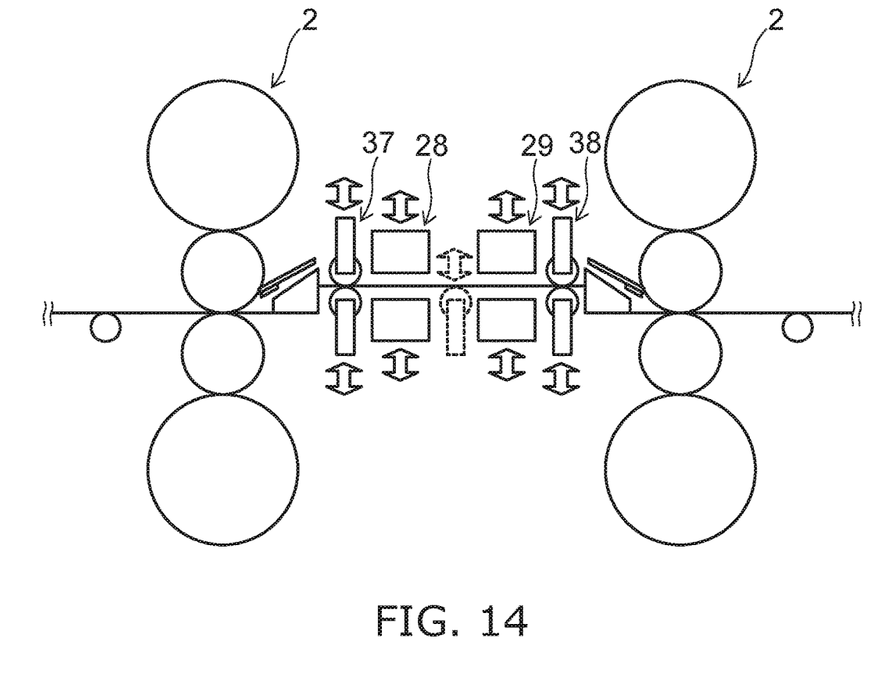
FIG. 14 is a schematic view illustrating rolling equipment according to a seventh embodiment.

FIG. 14 is a schematic view illustrating rolling equipment according to a seventh embodiment.

The seventh embodiment of the invention will now be described based on FIG. 14. A portion of the Steckel mill is illustrated as being extracted in FIG. 14.

In FIG. 14, pinch rolls 37 and 38 are disposed instead of the tension rolls 32 and 33 between the mill stands 2. Also, the bar heaters 28 and 29 are disposed between the pinch rollers 37 and 38. The pinch rolls 37 and 38 sandwich the hot strip 19 between a pair of rollers.

Thus, the tension rolls may be the pinch rollers 37 and 38. In such a case, the loop of the hot strip 19 between the mill stands 2 can be suppressed more appropriately.

Hereinabove, embodiments of the invention are described with reference to specific examples. However, the embodiments of the invention are not limited to these specific examples. For example, one skilled in the art may similarly practice the invention by appropriately selecting specific configurations of components included in rolling equipment such as coiler furnaces, mill stands, induction heaters, and tension rolls etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all rolling equipment practicable by an appropriate design modification by one skilled in the art based on the rolling equipment described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

The invention claimed is:

1. A rolling equipment, comprising:
   two coiler furnaces;
   a plurality of mill stands provided between the two coiler furnaces, the plurality of mill stands being for reverse rolling of a hot strip;
   at least two tension rolls provided between the mill stands; and
   an induction heater provided between the two tension rolls, the induction heater being configured to heat the hot strip in a designated reverse rolling or in each reverse rolling, the induction heater being configured to raise a temperature of a longitudinal direction of the hot strip and a temperature of a width direction of the hot strip,
   wherein the induction heater is a transverse type, a solenoid type, or a combination of the two types, the transverse type having flux perpendicular to a hot strip longitudinal-direction cross section, the solenoid type having flux perpendicular to a hot strip width cross section.

2. The rolling equipment according to claim 1, further comprising:
   a lifting/lowering mechanism being configured to change a position in a height direction of the tension rolls and a position in a height direction of the induction heater;
   a controller configured to control an operation of each of the mill stands and an operation of the lifting/lowering mechanism; and a tension detector configured to detect a tensile force value of the hot strip rolled by the mill stands and input the tensile force value to the controller, the controller being configured to perform a tension control of the hot strip to facilitate heating of the hot strip by the induction heater, the tension control including raising the tension rolls by the lifting/lowering mechanism after the mill stands engages the hot strip, forming a part of the hot strip between the mill stands into a trapezoid shape by the raising of the tension rolls, and controlling a rolling mill speed of the mill stands using the tensile force value from the tension detector.

3. The rolling equipment according to claim 2, wherein the tension rolls are pinch rolls.

4. The rolling equipment according to claim 1, further comprising:

a controller configured to control an operation of each of the mill stands, the controller being configured to perform a tension control of the hot strip to facilitate heating of the hot strip by the induction heater, the controller being configured to calculate the tensile force value and control the rolling mill speed using the tensile force value in the tension control, and the controller being configured to calculate the tensile force value using a rolling mill torque of the mill stands and a load of the mill stands after the mill stands engages the hot strip.

5. The rolling equipment according to claim 1, wherein the induction heater is the transverse type, and the induction heater is configured to heat the hot strip so that a temperature of an end portion of the hot strip is higher than a temperature of a central portion of the hot strip, the end portion is an end of the width direction of the hot strip, the central portion is central of the width direction of the hot strip.

6. The rolling equipment according to claim 1, further comprising:

a controller configured to control an operation of each of the mill stands; and a horizontal movement mechanism configured to move the induction heater in the width direction, the induction heater being the transverse type, and the controller being configured to control the horizontal movement mechanism and change a positon of the induction heater in the width direction.

7. The rolling equipment according to claim 1, further comprising:

a controller configured to control an operation of each of the mill stands, the induction heater being the transverse type, the induction heater including an upper inductor and a lower inductor, the upper inductor being provided above the lower inductor, the induction heater having a gap between the upper inductor and the lower inductor, the gap being for passing the hot strip, the induction heater being configured to change a length of the gap by moving at least one of the upper inductor and the lower inductor in a height direction, the controller being configured to control the length of the gap and detect a loop of the hot strip and a zero tension of the hot strip, and the controller causing the length of the gap in a detect state to be longer than the length of the gap in a non-detect state, the detect state being a state that the controller detects at least one of the loop and the zero tension, the non-detect state being a state that the controller does not detect the loop and the zero tension.

8. The rolling equipment according to claim 1, further comprising:

the induction heater being the transverse type, the induction heater including an upper inductor and a lower inductor, the upper inductor being provided above the lower inductor, the induction heater having a gap between the upper inductor and the lower inductor, the gap being for passing the hot strip, the induction heater being configured to change a length of the gap by moving at least one of the upper inductor and the lower inductor in a height direction, the controller being configured to control the length of the gap and detect a loop of the hot strip and a zero tension of the hot strip, and the controller causing the length of the gap in an engaged state to be longer than the length of the gap in an unengaged state, the engaged state being a state that the mill stands engage the hot strip, the unengaged state being a state that at least one of the mill stands does not engage the hot strip.

* * * * *